United States Patent
Whitehill

(10) Patent No.: US 12,555,158 B2
(45) Date of Patent: Feb. 17, 2026

(54) INTEGRATED E-BOOK AND E-COMMERCE SYSTEM AND METHOD

(71) Applicant: Robert Blake Whitehill, Montclair, NJ (US)

(72) Inventor: Robert Blake Whitehill, Montclair, NJ (US)

(*) Notice: Subject to any disclaimer, the term of this patent is extended or adjusted under 35 U.S.C. 154(b) by 359 days.

(21) Appl. No.: 18/309,389

(22) Filed: Apr. 28, 2023

(65) Prior Publication Data

US 2023/0351488 A1  Nov. 2, 2023

Related U.S. Application Data

(60) Provisional application No. 63/336,328, filed on Apr. 29, 2022.

(51) Int. Cl.
*G06Q 30/0601* (2023.01)

(52) U.S. Cl.
CPC ..... *G06Q 30/0643* (2013.01); *G06Q 30/0603* (2013.01)

(58) Field of Classification Search
CPC ............ G06Q 30/0603; G06Q 30/0643
See application file for complete search history.

(56) References Cited

U.S. PATENT DOCUMENTS 9,053,640 B1 * 6/2015 Hendricks ............ G09B 29/001
10,902,395 B1 * 1/2021 Knas .................... G06F 16/9038

OTHER PUBLICATIONS

Texterity: Texterity "Make Adobe eBook" service supports enhanced e-books; Integrates e-book merchandising, sample chapters, purchase links. M2 Presswire [Coventry] Oct. 31, 2001: 1. (Year: 2001).*
A study into electronic book design and production: hyper-book and the hyper-book builder. Catenazzi, Nadia. University of Strathclyde. Doctoral Thesis. 1993. <https://stax.strath.ac.uk/concern/theses/gh93gz60h> (Year: 1993).*

* cited by examiner

*Primary Examiner* — Michael Misiaszek
(74) *Attorney, Agent, or Firm* — Barry Choobin; Patent 360

(57) ABSTRACT

A system and method for integrating eBooks with characters, actors, feature films, and brands. Words in the eBook can be functionalized to associate them with multimedia elements. For example, the word "Jacket" can be associated with an image of an actor wearing a Jacket. The activation of the functionalized word results in a pop-up screen that shows the multimedia element and an option to purchase the merchandise shown in the multimedia element, such as the Jacket.

12 Claims, 3 Drawing Sheets

INTEGRATED E-BOOK AND E-COMMERCE SYSTEM AND METHOD

CROSS-REFERENCE TO RELATED APPLICATIONS

This application claims priority from a U.S. Provisional Patent Appl. No. 63/336,328 filed on Apr. 29, 2022, which is incorporated herein by reference in its entirety.

FIELD OF INVENTION

The present invention relates to a system and method for presenting digitally readable content, and more particularly, the present invention relates to a system and method that integrates multimedia and shopping experience in a digital reading platform.

BACKGROUND

Digital books or eBooks have become quite popular slowly replacing printed books. The primary reason for the increasing popularity of eBooks is accessibility. The eBooks can be downloaded to personal digital assistants, such as smartphones, from anywhere. The reader has the flexibility to read the eBook anytime and anywhere. Trips to bookshops or libraries can be avoided. The increasing popularity of eBooks has caused the introduction of specialized reading platforms, such as Amazon Kindle. Such platforms are specifically designed for reading. The platforms provide a more immersive reading experience and reduce digital eye fatigue.

Apart from improving readability, there are no significant innovations in the eBook industry. Many get bored after some time with eBooks. Moreover, the sources of revenue are extremely limited, and thus the cost of eBooks remains high.

A need is therefore appreciated for a system and method that overcome the aforesaid drawbacks and limitations of present content delivery systems.

The terms "film", "feature film", "motion image media", and "movie" are interchangeably used hereinafter and refer to a movie, television series, or streaming media, including but not limited to any "motion image media" with theatrical, TV, cable, streaming, and DVD distribution methods existing or yet to be created.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed toward a system and method that integrate multimedia and shopping experiences with digital reading platforms.

It is another object of the present invention that additional sources of revenue can be generated.

It is still another object of the present invention that eBooks reading experience becomes more interesting.

It is a further object of the present invention that the system and method allow brands to advertise and promote their brands.

It is yet another object of the present invention that the system and method save the time and effort of the readers in buying specific merchandise.

It is a further object of the present invention that the system and method allow for generating sales of merchandise and services.

In one aspect, disclosed are a system and method to save the time and effort of readers in buying specific merchandise, with the object of better maintaining reader engagement with the eBook and associated brands, by presenting merchandise images cached within the book, linking to customized points of sale for merchandise, just one click away from the book content, allowing one click purchases, and allowing one-click back to the reader's last reading position in the eBook. This thereby maintains the brand owner's highly coveted "stickiness" within the eBook environment by satisfying the reader's curiosity about brands as digitally close as possible to the eBook content, i.e., via the fewest clicks possible.

In one aspect, disclosed are a system and method for integrating eBooks, e-commerce, brands, and motion image media for a unique experience for readers. A platform is disclosed that allows eBook readers to buy merchandise related to or worn by characters in a motion image media, wherein the eBook includes a story of the motion image media.

In one aspect, a method is disclosed for promoting goods, the method implemented within a system comprising a processor and a memory, the method comprising presenting an eBook through an interface implemented on a user device, the eBook has readable content, one or more words of the readable content are functionalized, the one or more functionalized words are associated with one or more multimedia elements; receiving, through the interface, a selection of a functionalized word of the one or more words, the functionalized word is in a section of the eBook; upon receiving the selection, presenting a screen on the user device, wherein the screen comprises a multimedia element of the one or more multimedia elements, the multimedia element is associated with the functioned word, the screen further comprises a "Back to Reading" soft button and a "Shop" soft button, wherein activation of the "Back to Reading" soft button causes the screen to disappear and the section of the eBook is presented to the user to continue reading, wherein activation of the "shop" soft button causes processing of a transaction associated with the multimedia element and simultaneously causes the screen to disappear returning to the section of the eBook. The one or more multimedia elements comprise images depicting goods or services. The one or more multimedia elements comprise images depicting actors wearing merchandise associated with a feature film. The transaction is for the sale of the respective merchandise. The method further comprises preconfiguring a delivery address and a payment method for the transaction. The method further comprises notifying the reader about the completion of the transaction.

The method further comprises updating the one or more multimedia elements with one or more new multimedia elements; and notifying the reader about the update. In an adapted feature film brands and styles are fixed. Thus, the method further comprises the flexibility to change and update brand styles with new multimedia elements in the eBook, maintaining evergreen relevant brand styles which are now extremely costly to alter in feature film.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
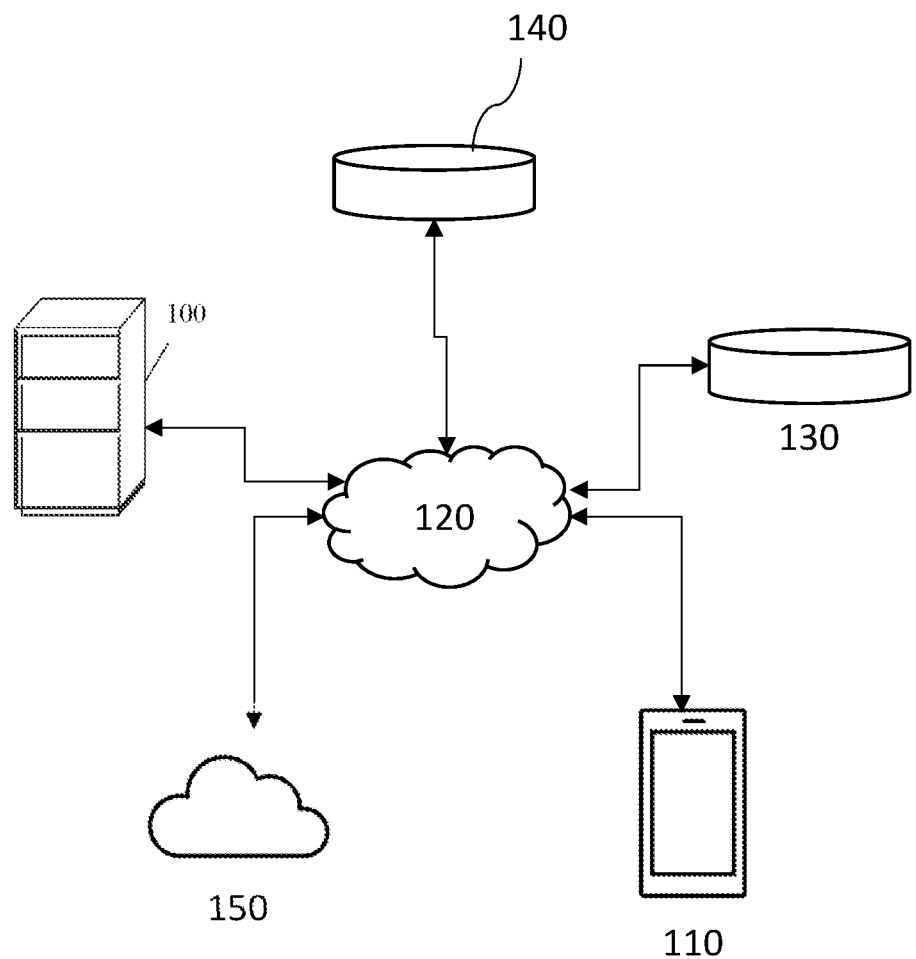
FIG. 1 is a block diagram illustrating an environment of the system, according to an exemplary embodiment of the present invention.

The subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting to embodiments of the invention. As used herein, the singular forms "a," "an," and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

Although operations may be described as a sequential process, some of the operations may in fact be performed in parallel, concurrently, and/or in a distributed environment, and with program code stored locally or remotely for access by single or multi-processor machines. In addition, in some embodiments, the order of operations may be rearranged without departing from the spirit of the disclosed subject matter.

The following detailed description is described with reference to the drawings, wherein like reference numerals are used to refer to like elements throughout. In the following description, for purposes of explanation, specific details may be set forth to provide a thorough understanding of the subject innovation. It may be evident, however, that the claimed subject matter may be practiced without these specific details. In other instances, well-known structures and apparatus are shown in block diagram form to facilitate describing the subject innovation.

Disclosed are a system and method for digital content delivery. A system is disclosed that integrates multimedia and shopping experiences into digital content reading platforms. The disclosed system can make the eBook reading experience more dynamic and interesting.

Referring to FIG. 1 there is an environmental diagram of the disclosed system 100. System 100 can connect to a reading device 110 which can be any computing device with a display. Examples of a reading device include a personal digital assistant (PDA), a smartphone, a laptop, a Kindle, and the like. Content for reading can be provided on the reading device by the disclosed system. The reading device can take input from a user using a suitable input interface. The input interface can be a pointer, a touch interface, voice input, and the like. It is understood that the reading device can include more than one input interface. The disclosed system can connect to the reading device through a network 120. Network 120 may be a wired network, a wireless network, or may also include a combination of the wired and the wireless networks. For example, network 120 may be a local area network (LAN), a wide area network (WAN), a wireless WAN, a wireless LAN (WLAN), a metropolitan area network (MAN), a wireless MAN network, a cellular data network, a cellular network, and the internet, etc.

The disclosed system can also connect with content database 130. Readable content, such as eBooks, can be stored in the content database. The content database can be a part of the disclosed system, or it can be external to the system. The system may also have an internal content database as well as being able to connect to one or more external databases for the content. The system can also connect to a multimedia database, which can store multimedia elements related to the content. In one aspect, the multimedia elements can be embedded within the content, for example, images can be embedded within an eBook. Alternatively, an address of a multimedia element, the multimedia element stored separately, can be embedded with the respective content, and accessed from within the content. For example, addresses of images can be embedded within the eBook, and such images can be accessed from within the eBook. The system can also connect to a shopping platform that provides merchandise linked to and related to the multimedia elements. The shopping platform can execute purchase transactions of the merchandise.

Figure 2:
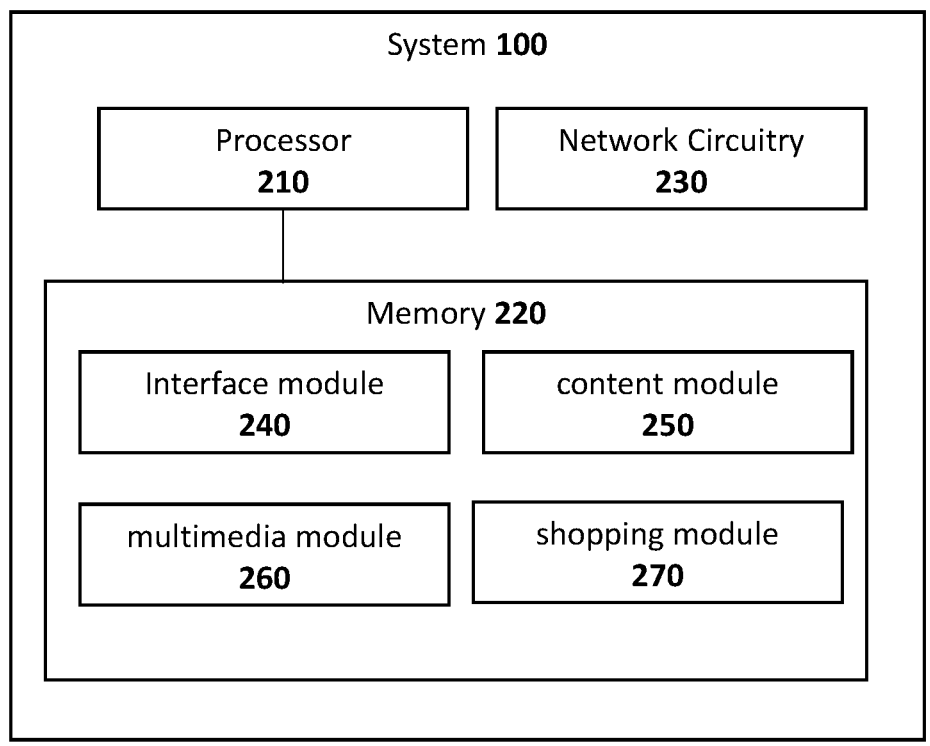
FIG. 2 is a block diagram illustrating an architecture of the system, according to an exemplary embodiment of the present invention.

Referring to FIG. 2 which is a block diagram showing an architecture of the disclosed system 100. The system includes a processor 210 and a memory 220, wherein the memory is coupled to the processor. The processor can be any logic circuitry that responds to, and processes instructions fetched from, the memory. The memory may include one or more memory chips capable of storing data and allowing any storage location to be directly accessed by the processor. The memory includes modules according to the present invention for execution by the processor to perform one or more steps of the disclosed methodology. The system can also include network circuitry 230 for connecting to an external network, such as a network 120.

The memory can include one or more modules, which upon execution by the processor can perform one or more steps of the disclosed methodology. The modules may be a software; code segments in one or more computer-readable languages; graphical and or/textual instructions; applets; pre-compiled code; interpreted code; compiled code; or computer programs. Memory 220 may include an interface module 240, a content module 250, a multimedia module 260, and a shopping module 270.

Figure 3:
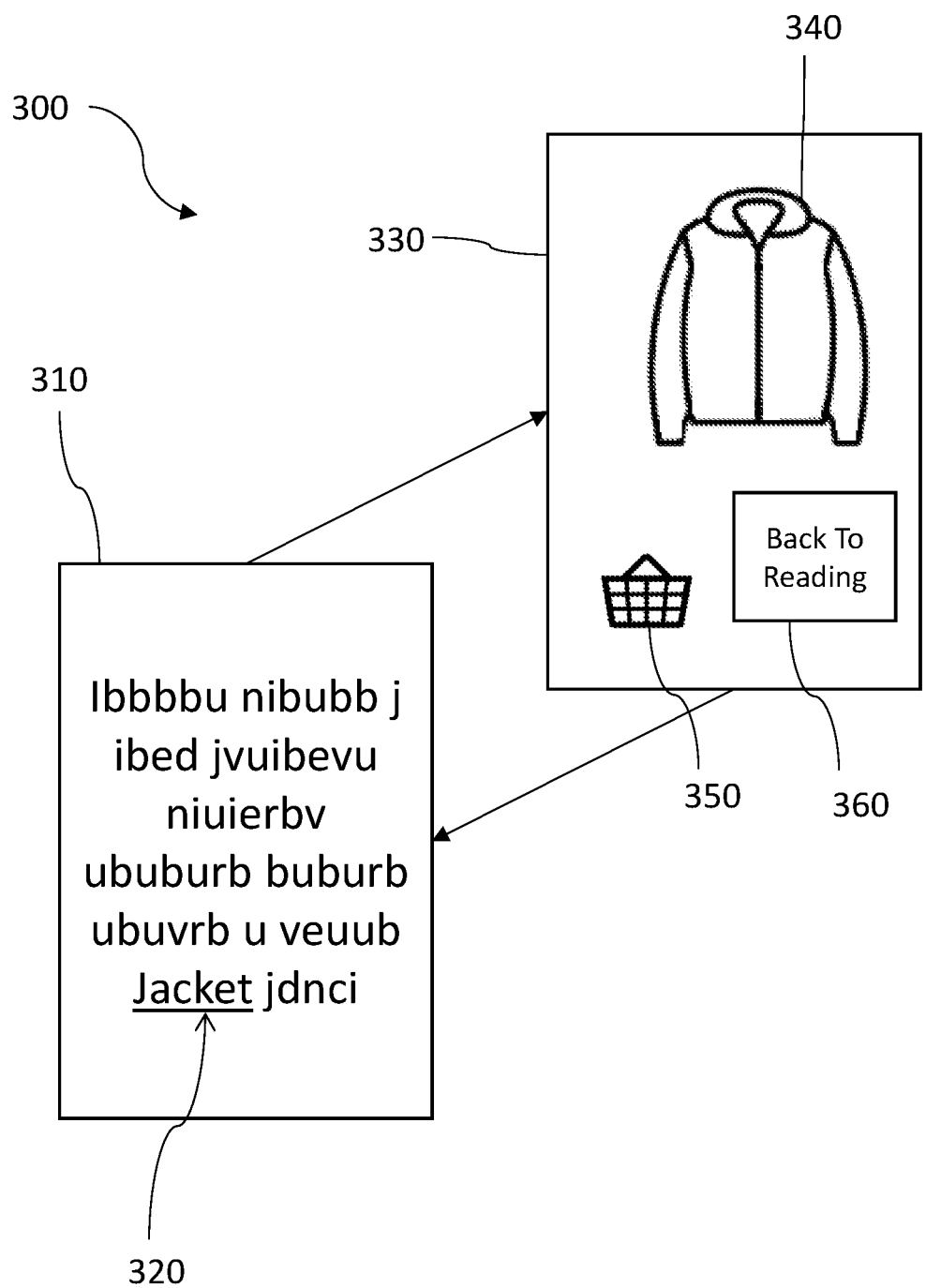
FIG. 3 shows a section of eBook and a screen implemented by the system, according to an exemplary embodiment of the present invention.

The interface module, upon execution by the processor, can provide an interface for a user to interact with the disclosed system. An example of the interface is shown in FIG. 3. The interface can be provided as an application software that can be installed on the reading device 110. The application software can be developed for Android™, iOS, and any other known operating platform for mobile devices. The application software can be made available through a distribution service provider, for example, Google Play™ operated and developed by Google, and the App Store by Apple. In addition to the application software, a website-based interface can also be provided through the world-wide-web. The application software can also be provided for desktop environments, such as Windows™, Linux, and macOS. The user interface may permit interactions with a user through the user device/reading device, wherein information can be presented within the user interface by system 100 and information can be received by the system 100 from the user. The terms "user" and "reader" are interchangeably used herein. The terms "user device," "reading device," and "reader device" are also interchangeably used herein. The eBook can be downloaded to and presented on the reader device through the interface.

The content module can, upon execution by the processor, receive a request from the user for presenting content, and in response to the request, can present the requested content through the interface. The content can be an eBook with embedded multimedia elements or embedded addresses to the multimedia elements.

The multimedia module, upon execution by the processor, can present multimedia elements, such as images, upon receiving any input from the user.

The shopping module, upon execution by the processor, may allow purchasing merchandise with a single click or input through the interface, wherein the merchandise are linked to the respective multimedia elements.

Referring to FIG. 3 shows an exemplary embodiment of the interface 300 provided by the interface module. Screen 310 of the interface can present the content on the reading device, wherein the content can be readable content, such as a story or an eBook. The story can be a story of a feature film, or a story later made into a feature film. The characters of the feature film can be portrayed in the story as well, including the actors playing the characters in the feature film. For example, a feature film can be made based on a story already published. Alternatively, a story of a feature film can be published before the release of the feature film. A user reading the story can later watch the movie based on the respective story. The disclosed system can allow portraying the merchandise promoted by the actors and characters in the feature film into the story, providing a more immersive experience to the user, as well as allowing the user to get the respective merchandise while reading the story through the disclosed platform. The disclosed system can be commercially useful because it allows the brands associated with a feature film to further promote and sell their merchandise.

The disclosed platform can allow users to access different brands and merchandise related to characters or actors in a feature film without the hassle of looking for the same in online and offline stores. The user, while reading, can purchase the merchandise with minimal intrusion into the reading experience, but have a more delightful and immersive experience.

In certain implementations, the content can be embedded with multimedia elements, such as images, videos, and the like. Alternatively, the multimedia elements can be stored elsewhere, and the addresses of these multimedia elements can be embedded in the content and accessible from within the content. Suitable words can be associated with multimedia elements and said words can be made functional for accessing the respective multimedia element. FIG. 3 shows a screen 310 having readable content, and a word "Jacket" 320 within the content is underlined. The word can be highlighted by underlining, italicizing, using a different color, or any similar method that distinguishes a word or phrase from the rest of the content. The word "Jacket" can be made functional by linking the word to a multimedia element, wherein the user can click the word "Jacket" to access the associated multimedia element. The multimedia element can be accessed from within the content, wherein clicking on the functionalized word pops up another screen 330 that shows the associated multimedia element 340 which is a Jacket. The screen also offers an option to buy the shown Jacket using a "shop" icon 350 displayed at the bottom of the screen 330. Any information needed for digital purchases can be preconfigured by the shopping module, including the delivery address and payment methods. Optionally, the user can also select the size, color, and the like feature of the merchandise, wherein such options can be provided on the screen itself. The payment module allows completing the transaction with a single click, i.e., by just clicking one icon. The transaction can be completed in the background, and the user can be presented with a confirmation, and the screen 330 can then be closed by the shopping module, and the section of the content, having the clicked functioned word, can be presented to the user through the first screen, so that the user can continue reading. It is to be noted that the confirmation dialog can be optional, and the user can be notified about the completion of the transaction by any other means, such as a text message. Thus, upon clicking the "shop" icon, the screen 330 can close automatically and the section of the content having the clicked functionalized word, on the screen 310, can then be presented again to the user, allowing the user to continue reading. The first screen is returned to the same position so that the user can continue reading and does not have to scroll up and down to find the section that the user was last reading. For example, the functional word, when clicked by the user, can be bookmarked by the system and the same can be used to return to the respective section.

Thus, there could be minimal distractions while reading, and the entire purchase process can be completed within a few seconds without distracting the user from reading. It is understood that other information related to the merchandise can also be displayed on screen 330 with the multimedia element. Another icon, "Back to Reading" 360, can also be provided on the screen 330 which upon clicking causes the screen 330 to disappear and the user can continue reading.

In one implementation, a method is also disclosed that integrates multimedia and the shopping experiences with readable content, such as a story. The user reads a book on an Internet-enabled eBook reader device, phone, tablet, computer, or other Internet-connected digital devices. The user can see the word "Jacket" mentioned as part of the character's clothing. The word "Jacket" is highlighted. The user can touch the word "Jacket" on the reader app's screen, and it takes the user to an evocative photograph with an actor, model (or group of actors or models representing characters in the book) wearing that Jacket. The user can touch the photo and be taken to an online storefront point of sale where that Jacket and/or apparel can be purchased. The user can choose size and color, complete the transaction, and the item can be shipped to the user. The shopping module may also allow canceling or modifying the order later. With another click to close the screen, the user can be back to reading the story. The process can take about 59 seconds to complete the purchase and return back to the reading interface.

The disclosed method has different advantages for different people. For example, additional revenue can benefit publishers and authors. The producers can more easily adapt a story into a movie. The brands' partners can benefit from brand building and promotions. The user going through the story, characters and actors in the story, and accessing the associated multimedia elements forms a parasocial bond with the characters and the actors, which causes the readers to become brand customers, some of whom become moviegoers arriving at the theater where they have their brand purchase, emotionally and dynamically, affirmed by seeing that brand used in the movie, and who then leave the theater as brand evangelists. The disclosed system bonds the readers to the story, brands, characters, and actors, and the filmed adaptation, thereby initiating revenue streams far in advance of the movie release, and better than ever possible before. The disclosed system can convert internet-enabled reading devices to points of sale for brand partners, taking advantage of the fact that 63% of Millennials shop on their devices every day.

The product placement and point-of-sale opportunity presented by an eBook or eBook series offer feature film branding strategists a powerful way to diversify and expand the consumer-brand interface. It takes an average leisure fiction reader 13 to 15 hours to read a book.

The disclosed system, utilizing the digital reader eBook product placement/brand integration features, can offer significant consumer/brand interface time that is available all at once in the book, and offers far more interface time than the two hours available per film adaptation. Even considering the global reach and impression-generating power of feature film product placement branding, moviegoers still cannot buy the product in the theater. At present, when a movie-goer sees a branded product in a movie, the brand strategist hopes that sometime between the moviegoer's departure from the theater and putting their head down on the pillow that night, a web search will take place and a purchase of the branded product will be made. The said process is cumbersome, and often the user may land on the wrong listing.

At the very least, in the digital reader eBook product placement/brand integration feature, a marketing impression and a strong aspirational association can be created between the brand, the reader, and the moviegoer. With standard movie product placement, a moviegoer might arrive at the theater with little or no knowledge of the brand, and they leave the theater aware, informed, and perhaps curious to know more about the brand. Using the disclosed system, this parasocial relationship (the viewers' feeling of genuine intimacy with the characters and the actors or models portraying them) creates a deep-time super-impression long before the movie comes out. The disclosed system allows readers, who become moviegoers, to arrive at the theater as customers already wearing the sponsored brands; with their purchases dynamically validated by seeing their brands during the movie experience, they leave the theater as a brand evangelists. Such a multimedia experience can be provided by the disclosed system for one or more characters in the story as well as for various events in the story. Various kinds of merchandise, goods, services, and the like in the story can be portrayed by the disclosed system. Examples include sports apparel, beverages, timepieces, eyewear, makeup products, automotive products, aviation items, and diving gear. Sports apparel can be the main category, and many big and small brands can be associated with the disclosed system to promote and sell their products. Individual characters could wear different watch brands, or as is usual and customary in feature film branding, a single brand with different styles could be worn by different characters. Various eyewear brands can be associated with the disclosed system. The character in the eBook can drive a specific brand of car which is promoted through the disclosed system. Similarly, the disclosed system can provide an image of a character wearing a given brand of wetsuit, making the reading experience more realistic as well as promoting the diving gear's brand and providing an immediate opportunity to buy the product.

In particular, the characteristics and uses of a product can be illustrated in the eBook story itself. For example, in a section of the story, some sensitive operations require utmost concealment, and the character may not use traditional SCUBA gear, which leaves a trail of bubbles easily seen by wary sentries. Instead, the character infiltrates using a particular brand of rebreather equipment that leaves no bubbles, recycling exhaled air by scrubbing out the carbon dioxide and adding fresh oxygen. Said equipment of the particular brand can be promoted and made available for sale through the disclosed system. Then eventually, the rebreather brand appears in the feature film adaptation of the eBook story.

Also, in an action eBook, a character may have or fly a particular plane. Although the disclosed system may not allow for selling planes, the brand making the planes can be promoted by the disclosed system by providing a multimedia and informative screen about the airplane.

In certain implementations, in addition to the photographic images, the disclosed system can be used to link the reader to digital feature film marketing materials, including but not limited to star and director interviews, movie trailers, featurettes, behind-the-scenes stories, and production stills. As the day of the adapted film's premiere approaches, the disclosed system can include or offer links to movie magazine-style content promoting the film.

In case the eBook reader prefers an uninterrupted reading experience and does not wish to touch the highlighted brand-related words like "Jacket" while reading, the reader will still see the photographs at the end of the eBook. In such a case, the images can be embedded within the eBook and presented at the end of the eBook. The reader can view the images as they go through the book one at a time, linking one highlighted brand item at a time, or they can view all the images all at once upon completion of reading the story in the eBook. The reader's U/E (User Experience) can be completely customized by the reader as they proceed through the eBook to their particular media consumption style.

It is understood that the aforesaid embodiments can be implemented on any eBook, even if it is not currently slated for adaptation into a feature film, whether the brand images are harvested from point-of-sale images, are worn by unknown models, or worn by name actors and celebrities representing the characters in the books. The UI (User Interface) remains the same. The UE (User Experience) deepens in marketing and sales power the more the images and video support the crucial parasocial bonds between readers and known A-List talent, feature film development, adaptation, and distribution.

In certain implementations, the disclosed system and method may allow motion image media producers to A/B test different casting choices with readers to see which casting choices result in the highest volume of merchandise and services sold. This can be done during the film's early (least costly) development timeline before talent choices are finalized for actual production. Verifying the right cast as early as possible via capturing this vital data point can prevent casting errors.

Also, engaging readers in casting choices may increase book sales, and further bind readers to want to see their choices on the screen, leading to ticket sales and hours of motion image media content viewed (the current metric for streaming services.) Readers always have opinions on which actors have a right to particular roles. Readers can vote on talent. Viewers already vote via text and apps on programs such as Dancing with the Stars, America's Got Talent, X Factor, and The Voice. Also, capturing sign-in data on voting opportunities offers producers and brands valuable demographic and marketing data for movie production and eventual distribution.

For eBooks not immediately destined for adaptation into motion image media, such A/B tests during the early release of the book could inform potential producers which books generate more sales of merchandise and services. This is an important data point in the potential producers' decision calculus on which books are the best candidates for development into motion image media.

Thus, the disclosed system and method can be deployed on both eBooks slated for motion image media, and also on books that are not immediately slated for motion image media, but which warrant testing for this possibility. For to-be-released motion image media, the disclosed system and method can offer an immersive pre-release experience to the readers that includes brand promotion and sales well before the movie's premiere, when revenue from ticket sales begins, and even well before the movie's distribution, when revenue from product placement agreements begins.

Embodiments of the above-described system and method can also be adapted for printed books. For example, the word "Jacket", or the phrase "Under Armour Jacket" on a page of the book can be italicized. In the margin of the page, next to the italicized word or phrase, a discrete QR code can be printed. A URL can be encoded in the QR code, wherein the QR code can be read by a user device. Reading the QR code by the user device may download an interface on the user device showing images of the Jacket in use by an actor representing a character in the story. The interface can be similar to screen 330 shown in FIG. 3 allowing the one-click purchase of the merchandise, such as the jacket in the above example In certain implementations, the embodiments of the present invention can also be adapted for a printed cookbook. For example, a recipe in the cookbook has a discrete QR code in the margin, the QR code has a URL to present a point-of-sale interface on the user device. The interface can present ingredients in the recipe. The interface allows users to select the required ingredients and order the same for delivery to their homes. The reader can customize their purchase, and buy just dry ingredients for a recipe, or buy dry and fresh ingredients for the recipe, or buy an almost fully prepared warm-and-serve option.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for integrating multimedia and shopping experiences with digital reading platforms, the method implemented within a system comprising a processor and a memory, the method comprising:

rendering of an eBook, through a first screen of an interface implemented on a user device, the eBook has readable content, one or more words of the readable content are functionalized, the one or more functionalized words are associated with one or more multimedia elements;

receiving, through the interface, a selection of a functionalized word of the one or more words from a section of the eBook, the section presented on the first screen of the interface;

upon receiving the selection, rendering a second screen of the interface on the user device, wherein the second screen comprises a multimedia element of the one or more multimedia elements, the multimedia element is associated with the functionalized word, the second screen further comprises a Back to Reading soft button and a shop soft button, wherein activation of the Back to Reading soft button causes the second screen to disappear and the section on the first screen is presented, wherein activation of the Shop soft button causes automatic processing of a transaction associated with the multimedia element and simultaneously causes the second screen to disappear returning to the section of the eBook;

updating the one or more multimedia elements with one or more new multimedia elements; and notifying a reader about the update.

2. The method according to claim 1, wherein the one or more multimedia elements comprise images depicting merchandise or services.

3. The method according to claim 1, wherein the one or more multimedia elements comprise images depicting actors wearing merchandise associated with a feature film.

4. The method according to claim 3, wherein the transaction is for a sale of respective merchandise.

5. The method according to claim 1, wherein the method further comprises:

pre-configuring delivery address and payment method for the transaction.

6. The method according to claim 1, wherein the method further comprises:

notifying a reader about completion of the transaction.

7. A system for integrating multimedia and shopping experiences with digital reading platforms, the system comprising a processor and a memory, the system configured to implement a method comprising:

rendering of an eBook through a first screen of an interface implemented on a user device, the eBook has readable content, one or more words of the readable content are functionalized, the one or more functionalized words are associated with one or more multimedia elements;

receiving, through the interface, a selection of a functionalized word of the one or more words from a section of the eBook, the section presented on the first screen of the interface;

upon receiving the selection, rendering a second screen of the interface on the user device, wherein the second screen comprises a multimedia element of the one or more multimedia elements, the multimedia element is associated with the functionalized word, the second screen further comprises a Back to Reading soft button and a shop soft button, wherein activation of the Back to Reading soft button causes the second screen to disappear and the section on the first screen is presented, wherein activation of the Shop soft button causes automatic processing of a transaction associated with the multimedia element and simultaneously causes the second screen to disappear returning to the section of the eBook;

updating the one or more multimedia elements with one or more new multimedia elements; and notifying a reader about the update.

8. The system according to claim 7, wherein the one or more multimedia elements comprise images depicting merchandise or services.

9. The system according to claim 7, wherein the one or more multimedia elements comprise images depicting actors wearing merchandise associated with a feature film adapted from the eBook.

10. The system according to claim 7, wherein the transaction is for a sale of respective merchandise.

11. The system according to claim 7, wherein the method further comprises:

pre-configuring delivery address and payment method for the transaction.

12. The system according to claim 7, wherein the method further comprises:

notifying a reader about completion of the transaction.

* * * * *